Patented Aug. 16, 1949

2,479,270

UNITED STATES PATENT OFFICE 2,479,270

UTILIZATION OF CITRUS AND PINEAPPLE PRODUCTS IN MAKING RESIN COMPOSITIONS

Oscar W. Schroeder, Los Angeles, Calif., assignor of twenty per cent to William E. Beatty, Los Angeles, Calif., and three one-hundredths to Belle A. Milnar, St. Paul, Minn.

No Drawing. Application April 19, 1947, Serial No. 742,733

13 Claims. (Cl. 260—17.2)

The invention relates to thermo-setting plastic such as synthetic resin types of plastics viz., phenol formaldehyde resin, commonly called phenolics, alkyd type resin, commonly called glyptal, and the like. The invention relates to treatment of the liquid phase of such resins and more particularly to lowering the cost, delaying the polymerization during preconversion period to prevent setting during shipping or storage, hastening polymerizing or curing during manufacturing or conversion period, coloring, and delaying the curing action of a catalyst so that a quantity of resin, catalyst and dye stuff can be prepared for use over a period of time as a secondary color coat for interspersion with a base coat of a different color.

One of the objects of the invention is to substantially cheapen the cost of liquid resin type plastic which has various industrial uses. This is accomplished by employing the natural raw, uncooked, undehydrated comminuted pulp of citrus fruits such as oranges, lemons, etc., also the leaves, hull or fruit of pineapple, or waste products thereof in their natural state, as a substantial part of the liquid plastic.

By "pulp" of citrus fruit is meant the skin, rind and web, and perhaps the seeds, namely everything that is left after one squeezes the juice out of the fruit, even though a small quantity of the juice itself can be used. One would suppose it would be impractical to use additives such as citrus pulp, or pineapple leaves (or 70% alcohol) to liquid resin for the reason that it is well known that they contain moisture and citrus pulp contains oil, moisture or oil being generally understood as preventing the liquid resin from setting. The invention provides a process of making it possible to use such moisture containing additives by employing hydrochloric acid as a catalyst.

Large quantities of citrus pulp are available and are commonly subjected to dehydration and sold for cattle food at a comparatively low price. It is unnecessary to dehydrate such pulp according to the present invention and hence, the pulp becomes more valuable when used in the plastic as it avoids the expense of the dehydration process, while increasing the body of the expensive plastic. Another advantage of the addition of citrus pulp to the resin plastic is that, judging by hand tests made on small samples, phenolic resin having citrus pulp in it is stronger than such resin without the pulp, and the same is true of shredded pineapple rind, fruit and leaves.

It is believed that the citrus pulp is more than a filler, and that a chemical combination, as distinguished from a mechanical mixture, results not only because of added strength but also for the following reasons. If 50% or more of an inert filler such as silica is added to liquid phenolic and cast, the casting becomes granular and weak, whereas up to 50% by volume of citrus pulp does not impair, but increases the strength. As a second reason, the mix of pulp and liquid plastic turns an opaque milky color when the HCl is added, indicating a chemical reaction. As a third reason, when the citrus pulp is added to the liquid resin, the usual amount viz. up to 25% of the usual filler viz. walnut flour or wood flour can also be used, even when using up to 50% by volume of the citrus pulp. Also, ten per cent by volume of 70% methyl alcohol can be used as a solvent or thinner.

On using citrus pulp as an additive, when the casting or coating sets it will be a uniform color, or mottled depending upon the fineness of the citrus pulp, assuming no added color material. If the skin and rind are grated with an ordinary household grater so that the comminuted pulp is rather coarse, the orange color of the skin disappears and instead the casting has the color somewhat of pea soup with milk added to it, mottled with small dark green specks in it, the specks having been converted from their original orange color, assuming about thirty parts liquid phenolic plastic to about one to three parts of commercial (aqueous fuming) HCl are used. Or the green can be eliminated and the casting made opaque milky white with no orange or green color, if about thirty parts liquid phenolic resin to about five parts of such HCl are used. If the pulp is finely divided for example, by passing it through a screen having about thirty meshes to the linear inch, the casting is a uniform color, not mottled, if about thirty parts of resin to five of such HCl are used. To sum up the matter, the following are the reasons for believing that chemical action takes place, namely increased strength, the ability to use large quantities of the pulp without impairing the strength, the conversion of the pulp to a different color, and the fact that usual fillers can also be added. In fact, chemical combination appears to take place before such HCl is added, as the pulp changes to a milky white color when stirred in liquid phenol formaldehyde resin. The same reasons apply to pineapple leaf, rind or fruit. Equal parts of shredded pineapple and liquid phenol formaldehyde resin have been used with about 10% of such HCl. The resin and pineapple are preheated to about 90 degrees F., then the acid is stirred in, and the mix will set in about two hours at a temperature of about 90 degrees F. to 110 degrees F. The product is solid, milky white, and very tough.

The comminuted citrus pulp or pineapple leaf or rind can be stirred in the liquid resin and that mixture stored in bulk for days or weeks until ready for use. Such storing improves the breaking down of the pulp or the like into the resin. Liquid resin is commonly available as a very viscous fluid. If it is in transit or stored for a month or more, especially during hot weather, polymerization may set in to an extent making the resin rubber-like and useless. The orange pulp or pineapple products will delay this premature curing, thus making it possible to ship the resin over long distances or store it for a longer time. For example, a saucer of liquid phenolic resin, another saucer of 50% liquid phenolic resin and 50% grated orange pulp, and a third saucer of liquid phenolic with an equal part of a mixture of grated pineapple leaf and fruit, were placed on a window sill exposed to sunlight for about two hours each day. At the end of three days the plain resin had set, whereas the mixture in the two last mentioned saucers had not set at the end of ten days.

A wide range of color for the liquid resin is obtained by adding thereto any one of the various dyes available in powder form viz., aniline type such as the Easter egg or clothing dye commonly available; and by adding HCl as a catalyst.

If the color of the plastic when set is to be substantially the same as that of the dye, the HCl should first be mixed with the liquid synthetic resin, and after a short delay while the mix is still viscous stir in the color. If the color is added to the liquid plastic before adding the HCl, the acid will bleach the dye, viz. a scarlet dye will appear as a pink color in the set plastic. This widens the range of colors. In either case, the liquid resin is preferably preheated to about 90 degrees to 125 degrees F., and either before or after adding the HCl, the dye stuff is added to the resin while the resin is heated.

The advantage of reducing the time required for the liquid resin to set or polymerize is obtained by giving the liquid resin a preliminary heat i. e., a preliminary polymerization treatment, insufficient, however, to cause it to set, for example to from 90 degrees F. to 125 degrees F. and by then adding HCl as a catalyst to the heated resin whereupon the resin hardens in a shorter time and without the necessity for a subsequent curing heat treatment, although curing in direct sunlight or at a temperature of about 90 degrees F. to 125 degrees F. is preferred as this reduces the curing time. If citrus pulp, pineapple leaf or the like is to be used, it is shredded, grated, mashed or otherwise reduced to small particles and mixed with the resin, and the preliminary heat treatment is given to that mixture of resin and additive.

Another advantage of curing the resin with this mineral acid and mild heat treatment is that a thicker coating with more body results than if liquid resin with weak organic acid viz. acetic were cured at an elevated temperature. This is of advantage for coating bricks, rough wood, metal, pasteboard or the like to simulate stone, tile or solid plastic.

If increased flexibility of the set plastic is desired, the liquid resin may be 75% or more of phenol formaldehyde resin and 25% or less of glyptal, treated as above.

The larger the amount of HCl the more rapid is the evolution of bubbles and the faster the plastic will set. When used as an adhesive for two pieces of wood, about one inch square, thirty parts of liquid synthetic resin with or without the citrus pulp to about five parts of HCl appear to be substantially completely set in about fifteen minutes although a strong bond results in less time, and without using artificial heat or pressure.

For translucent articles, use may be made of a catalyst partly HCl, partly acetic acid viz. one part HCl, ten parts acetic acid to ten parts liquid resin. Mix acetic and heated liquid resin, later add HCl while resin is still warm and if color is desired, powder aniline dye is added last, and stirred in the warm resin. Also as catalyst, one can use 1% to 3% HCl and no acetic acid. The HCl hastens the setting time, while giving a translucent end product.

The plastic of this invention may be used for any of the usual industrial purposes. When used for molding, one does not have to contend with evolution of bubbles over a long period of time, or use heat to cure, especially if the liquid resin, with or without the citrus pulp, is preheated for several minutes to 100 degrees F. to 125 degrees F. and if a large amount of HCl viz. about 15% to 20% is used. However, smaller amounts of HCl such as 5% and curing in direct sunlight or at temperatures up to 125 degrees F. have been used and are preferred. The smaller the amount of acid and the lower the increase over 72 degrees F. for the resin the longer the time required to set, viz. 1% HCl and 72 degrees F. curing may take four days or more, while about 5% to 15% HCl, with preheating the resin to about 100 degrees F and curing at about 120 degrees F., the mix will set or harden in about two hours or less depending on the additives. The dye stuff, citrus pulp and pineapple delay the curing time.

All above references to HCl are to strong aqueous solution commonly called commercial grade HCl, and strong enough to fume. However, weaker acid can be used and is preferred when using the liquid resin as a coating composition for the reason that the action of the strong acid is so rapid in acting on the resin that a coating of liquid resin and 5% to 20% HCl will set with a rough surface, not a smooth surface. A smooth surface is usually preferred as it is desirable to use a thinner such as alcohol, it is preferred to mix the strong acid with the alcohol and add that mixture to the liquid resin.

For further details of the invention as applied to coating composition are as follows. Assume it is desired to apply a plastic coat to a wood letter, for advertising purposes, the wood being rough, not sanded and the color comprising a ground coat of one color interspersed with a pattern of one or more other colors. Dust the wood letter with silica flour as this makes the liquid stick better. Warm the wood base to about 100 degrees F. for ten minutes. Mix liquid synthetic resin with about 1% of glycerin and about 10% of silica flour and preheat for three or four minutes to about 120 degrees F. All percents are with reference to the percent of volume of the liquid resin, which is preferably phenol formaldehyde. While the above mixture is heated, stir in 10% of a mixture of one part of strong HCl and two parts of methyl alcohol (70% proof). While the mixture is still heated or warm, stir in dye stuff such as powder aniline dye of the desired color. For white color, omit the dye stuff and double the amount of silica flour. Apply with a brush or trowel to the warm wood base, or the base can be dipped in the coating. For spraying the coat on the warm base use three parts alcohol with the acid instead of two parts.

Previously the secondary color or colors should be prepared with the above formula and allowed to stand for a few minutes until it starts to set as indicated by turning white around the margin whereupon about 25% methyl alcohol is stirred in. This will delay the setting of the secondary color, mix at the atmospheric temperature such as 90 degrees, for four or five hours so that this secondary color can be used over a period of time.

While the base coat is about to set but still soft to the touch, in a desired pattern, apply the secondary color mix by dropping it from a glass rod or the like on to the ground coat. Other secondary colors in other patterns can also be applied if desired. The ground coat and the outer coats merge to some extent and level off to a smooth top surface. Thus, red and white streaks or lines can be applied to a black or other solid color ground coat, the distinctive colors of the secondary coat or coats remaining in their true color without blending with the ground color. That is, the application of a white secondary pattern to a red ground color does not result in a cured article wherein the pattern is pink but instead the pattern retains its original color. It is believed that this is partly due to the fact that setting has started when the secondary color is applied; also, high curing temperatures are not required, as the coating composition above described can be cured in about one hour at 120 degrees F. The above coating composition when applied to a preheated base such as wood is set sufficiently on contact with the heated base so that it is viscous or lacking in fluidity to an extent such that the coating will not run off when applied to a vertical wall on the base, while giving a single coat sufficiently thick and opaque that saw cuts, knots, grain or defects in the wood are not visible through the coat.

When using HCl as a catalyst, it has been found that the coating composition above described has the tendency to form bubbles or pits at the surface of the cured article. This is overcome by being careful not to stir in air bubbles after the HCl has been added, that is, the color should be stirred in gently with a large glass rod. Also, after the coating or coatings have been applied to the base of wood, metal or other material, the coating is allowed to set at atmospheric temperature, preferably not over 90 degrees, for about one hour, until a smooth skin is formed on the coating, as this skin entraps and prevents release of any further bubbles at the surface, and then the coated article is cured as above described viz. 120 degrees F. for one hour.

Various modifications may be made in the invention without departing from the spirit of the following claims.

I claim:

1. The step in the process of utilizing citrus pulp which comprises comminuting said pulp and mixing the comminuted pulp with phenol formaldehyde resin in liquid phase.

2. The step according to claim 1 wherein the pulp which is mixed with said plastic is not dehydrated.

3. The step according to claim 2 and the additional step of mixing in the ratio of about thirty parts of the pulp and plastic mixture to about one part to five parts of hydrochloric acid.

4. The process of obtaining a mottled green color solid plastic from liquid amber color phenol formaldehyde resin and orange pulp which comprises mixing said liquid resin and said pulp with hydrochloric acid in the proportion of about one part to three parts of acid to thirty parts of resin.

5. The process which comprises polymerizing a mixture of raw citrus pulp and liquid phenol formaldehyde resin by the combined action of heat and a hardening catalyst.

6. The process of delaying the polymerization of liquid phenol formaldehyde which comprises admixing therewith comminuted raw citrus pulp.

7. A composition of matter comprising liquid phenol formaldehyde and an admixture of comminuted raw citrus fruit pulp.

8. A composition of matter comprising the reaction product of one per cent to twenty per cent HCl, phenol formaldehyde, comminuted raw citrus pulp in substantial amount and a solvent for said phenol formaldehyde.

9. A composition of matter comprising the reaction product resulting from polymerization of phenol formaldehyde resin in the presence of comminuted raw citrus pulp.

10. The step in the process of utilizing a member of the group consisting of raw citrus pulp, raw pineapple pulp, raw pineapple leaves, and raw pineapple hulls, which comprises comminuting the pulp of said member and mixing the same with liquid phenol formaldehyde resin.

11. The process which comprises comminuting a member of the group consisting of raw citrus pulp, raw pineapple pulp, raw pineapple leaves and raw pineapple hulls, and polymerizing a mixture of said comminuted member and liquid phenol formaldehyde resin by the combined action of heat and a hardening catalyst.

12. A composition of matter comprising liquid phenol formaldehyde resin and an admixture of a comminuted member of the group consisting of raw citrus pulp, raw pineapple pulp, raw pineapple leaves and raw pineapple hulls.

13. A composition of matter comprising the reaction product of 1% to 20% HCl, liquid phenol formaldehyde resin, a comminuted member of the group consisting of raw citrus pulp, raw pineapple pulp, raw pineapple leaves and raw pineapple hulls in substantial amount, and a solvent for said phenol formaldehyde resin.

OSCAR W. SCHROEDER.

REFERENCES CITED

The following references are of record in the file of this patent:

UNITED STATES PATENTS

| Number | Name | Date |
|---|---|---|
| 1,216,728 | Pollak | Feb. 20, 1917 |
| 2,157,488 | Holzcker | May 9, 1939 |
| 2,280,934 | Seebach | Apr. 28, 1942 |
| 2,319,182 | Van der Pyl | May 11, 1943 |

FOREIGN PATENTS

| Number | Country | Date |
|---|---|---|
| 129,993 | Great Britain | July 16, 1919 |

OTHER REFERENCES

Megson, Jour. Soc. Chem. Ind., June 1938, pp. 189–197.

Lebach, Jour. Soc. of Chemical Ind., June 16, 1913, pp. 559–563.

Weber, Pacific Plastics, Oct. 1943, vol. 1, Nos. 4 and 5, pages 5, 6, 44, 46.